United States Patent
Du et al.

(10) Patent No.: US 8,174,987 B2
(45) Date of Patent: May 8, 2012

(54) METHOD AND APPARATUS FOR IMPLEMENTING OUTPUT QUEUE-BASED FLOW CONTROL

(75) Inventors: Wenhua Du, Shenzhen (CN); Zhenyao Wu, Shenzhen (CN); Dezhi Tang, Shenzhen (CN); Yanbin Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 215 days.

(21) Appl. No.: 12/509,081

(22) Filed: Jul. 24, 2009

(65) Prior Publication Data

US 2009/0290593 A1    Nov. 26, 2009

(51) Int. Cl.
*G01R 31/08* (2006.01)
(52) U.S. Cl. ..................... 370/236; 370/395.4
(58) Field of Classification Search .......... None
See application file for complete search history.

(56) References Cited

U.S. PATENT DOCUMENTS

| | | | |
|---|---|---|---|
| 5,983,278 A | 11/1999 | Chong et al. | |
| 6,141,323 A | 10/2000 | Rusu et al. | |
| 6,195,335 B1 | 2/2001 | Calvignac et al. | |
| 6,519,225 B1 | 2/2003 | Angle et al. | |
| 6,944,152 B1 * | 9/2005 | Heil | 370/360 |
| 6,980,520 B1 | 12/2005 | Erimli | |
| 2009/0161685 A1 * | 6/2009 | Du et al. | 370/412 |
| 2009/0270435 A1 * | 10/2009 | Corbett et al. | 514/278 |
| 2009/0290593 A1 * | 11/2009 | Du et al. | 370/417 |

FOREIGN PATENT DOCUMENTS

| | | |
|---|---|---|
| CN | 1848803 A | 10/2006 |
| CN | 101035067 A | 9/2007 |
| EP | 1622325 A1 | 1/2006 |
| WO | 2004010660 A1 | 1/2004 |

OTHER PUBLICATIONS

International Search Report from P.R. China in International Application No. PCT/CN2008/070188 mailed May 8, 2008.
Li Lemin, "The Research on Distributed Packet Scheduling Method for an Input and Output Queing Switch", Journal of Electronics and Information Technology, vol. 25, No. 4, pp. 515-521, (Apr. 2003).

(Continued)

*Primary Examiner* — Robert Wilson
(74) *Attorney, Agent, or Firm* — Conley Rose, P.C.; Grant Rodolph (57) ABSTRACT

A method and apparatus for implementing output queue-based flow control is provided. The method includes: implementing queue scheduling and flow control by using an output port-based cell queue and by counting the number of cells from different angles. In this system, the flow control and queue management are performed separately. The queue management is directly applied to the cell scheduling. The flow control does not directly depend on the cell statistical results in the queue management. Instead, it is implemented on the basis of the cell statistical results that are obtained according to the cell priority, output port and source chip number of the cells. Therefore, the provided method and apparatus may reduce and simplify the number of queues to be scheduled and implement fine and flexible back pressure control.

18 Claims, 6 Drawing Sheets

OTHER PUBLICATIONS

Foreign Communication From a Related Counterpart Application—English Translation of International Written Opinion, PCT/CN2008/070188, May 8, 2008, 5 pages.

Foreign Communication From a Related Counterpart Application—European Extended Search Report, EP Application 08706565.2-2416, Jan. 26, 2010, 6 pages.

Foreign Communication From a Related Counterpart Application—EP Application 08706565.2-2416, Office Action dated May 25, 2010, 10 pages.

Chiussi, F., et al., "The Atlanta Architecture and Chipset: A Low-Cost Scalable Solution for ATM Networking" World Telecommunications Congress, (International Switching Symposium), Sep. 21, 1997, pp. 43-52.

Lin, S., "Tag Port Processor" Functional Specification, Version 2 Revision 3, Dec. 12, 1997, pp. 1-29.

McKeown, N., et al., "Tiny Tera: A Packet Switch Core", IEEE Micro, Jan. 1, 1997, pp. 26-33.

Sapountzis, G., et al. "Benes Switching Fabrics with O(N)—Complexity Internal Backpressure", IEEE Communication Magazine, vol. 3, No. 1, Jan. 1, 2005, pp. 88-94.

Foreign Communication from a counterpart application, Chinese application 200710002741.3, Office Action dated Feb. 6, 2009, 5 pages.

Foreign Communication from a counterpart application, Chinese application 200710002741.3, English Translation Office Action dated Feb. 6, 2009, 4 pages.

Foreign Communication From A Related Counterpart Application, EP Application 08706565.2, European Office Action dated Jan. 26, 2012, 7pages.

* cited by examiner

Figure 1

(Prior Art)

(Prior Art)

METHOD AND APPARATUS FOR IMPLEMENTING OUTPUT QUEUE-BASED FLOW CONTROL

CROSS-REFERENCE TO RELATED APPLICATION

The present application claims the benefit of PCT application PCT/CN2008/070188 filed on Jan. 25, 2008, which claims priority to Chinese Patent Application No. 200710002741.3, filed with Chinese patent office on Jan. 25, 2007 and entitled "Method and Apparatus for Implementing Output Queue-Based Flow Control." The contents of these applications are hereby incorporated by reference in their entirety.

TECHNICAL FIELD

The present disclosure relates to network communications, and in particular, to a flow control technology.

BACKGROUND

Figure 1:
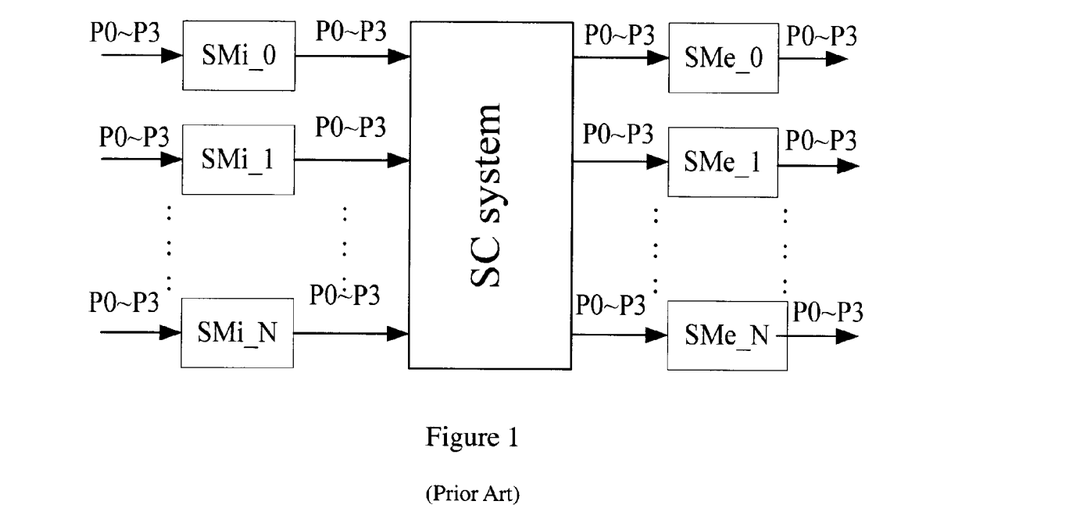
FIG. 1 shows the 3-level switching system including an SM and an SC in the prior art.

At present, a 3-level switching system is widely used in network communication. As shown in FIG. 1, the 3-level switching system includes the following chips:

(1) Switching memory chip (SM), used for implementing cell buffer, queue management and scheduling; and (2) Switching crossbar chip (SC), used for arbitrating SM requests, implementing non-blocking space division switching, and processing and forwarding collected back pressure information.

As shown in FIG. 1, the SM includes two parts:

(1) SMi, including input and output ports. The SMi is mainly used for buffering the cells to be switched, managing queues, sending requests to the SC, and performing scheduling based on the arbitration signal from the SC.

(2) SMe, also including input and output ports. The SMe is used for buffering the cells switched by the SC, managing queues, reporting the back pressure information from the SMe to the SMi, and performing cell scheduling.

In the 3-level switching system, any SMe can receive cells from any SMi; and cells sent from any SMi can be switched to any SMe through the SC.

Thus, for reasonable scheduling of cells in the 3-level switching system, when each SMi sends cells to an SMe at the same time, the cells from each SMi need managing reasonably.

Besides, in the 3-level switching system, related flow control measures must be provided to ensure the normal progress of the whole cell transmission process.

Figure 2:
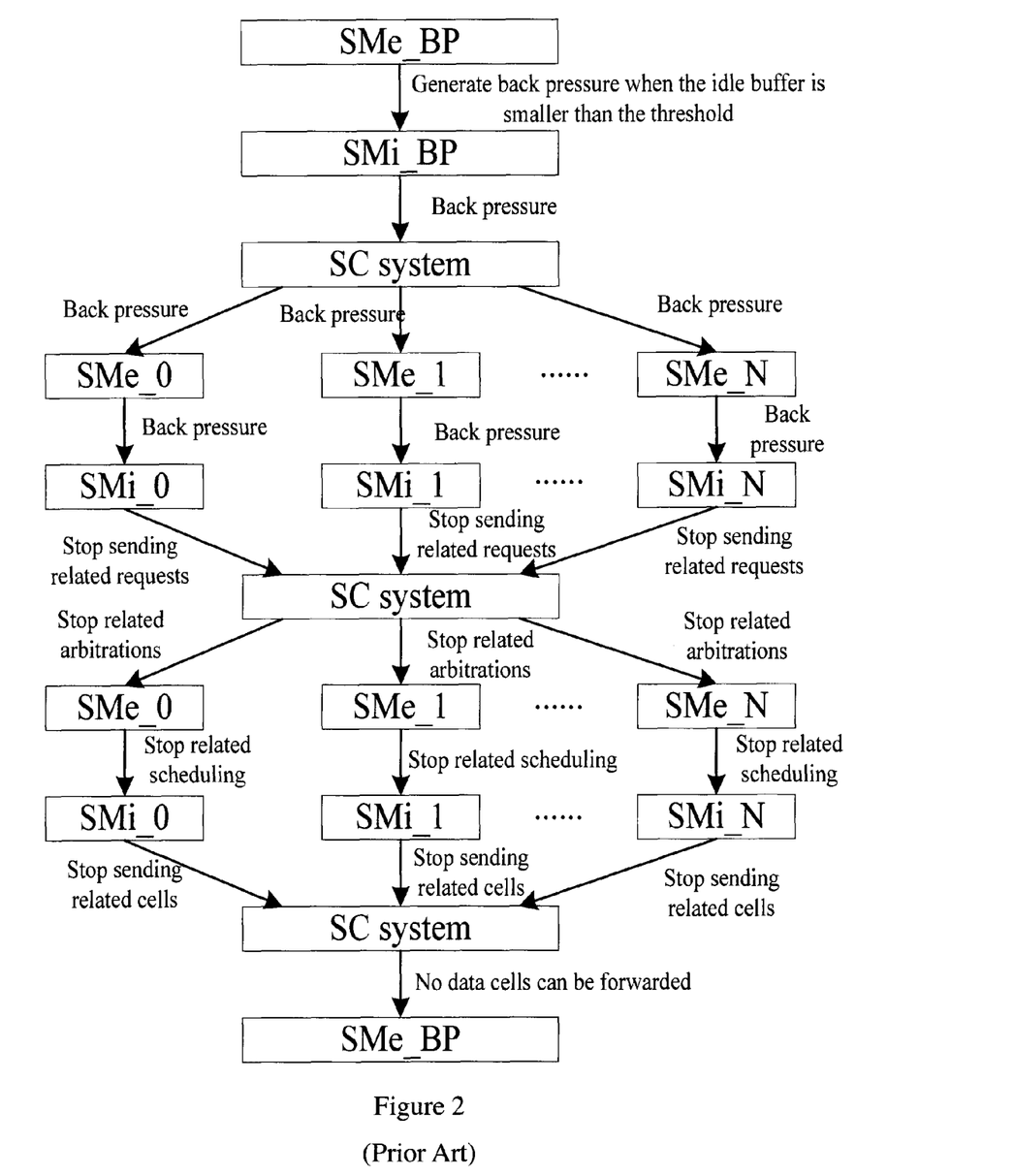
FIG. 2 shows the process of implementing back pressure control in the prior art.

As shown in FIG. 2, in the conventional 3-level switching system, back pressure control measures are taken to control the cell transmission process. The specific schemes are described as follows:

When an SMe detects that the idle buffer is smaller than a preset threshold, the SMe can notify the SMi of related information (also back pressure information). The SMi then saves the back pressure information in the cell header and sends it to the SC.

Upon receipt of the back pressure information in the cell header, the SC sends the back pressure information to each SMe.

Upon receipt of the back pressure information, each SMe notifies each SMi. After each SMi receives the back pressure information, those SMis that have sent requests stop sending requests.

Figure 3:
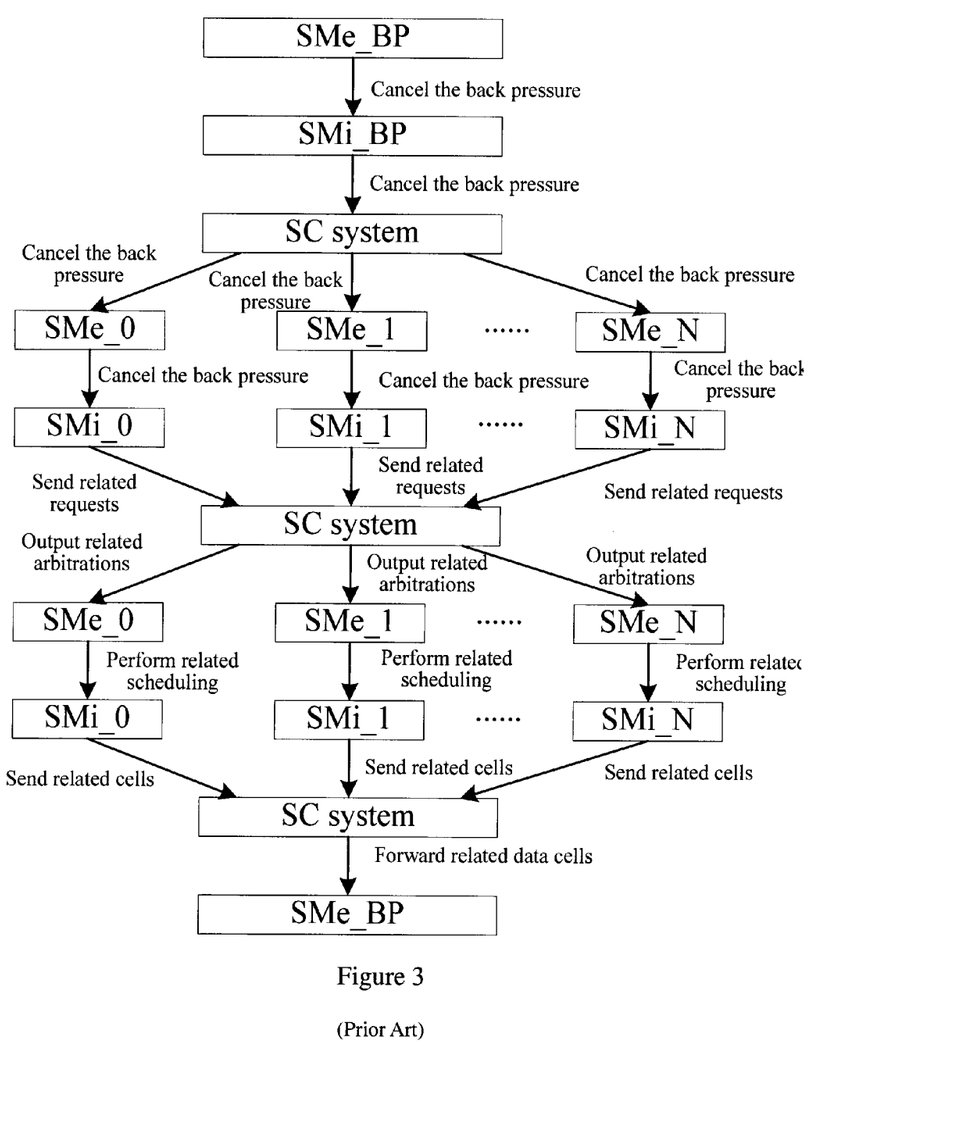
FIG. 3 shows the process of canceling back pressure control in the prior art.

When an SMe where back pressure (BP) occurs (SMe_BP) detects that the idle buffer is greater than a preset threshold, the SMe_BP notifies each SM of back pressure cancellation information through the SC in a way the same as the sending of back pressure information, as shown in FIG. 3. After each SM detects that the back pressure information is cancelled, SMis that have information to send re-send requests to the SC, or continue to send cells to the SMe through the SC.

BRIEF SUMMARY

Embodiments consistent with the present disclosure provides a method and apparatus for implementing queue-based flow control. It may be easy to implement the method and apparatus and flexible to set the flow control mechanism, thus satisfying the actual application requirements.

An embodiment of the present disclosure provides a method for implementing queue-based flow control. The method includes:

obtaining cell processing information from an input processing unit and from a cell scheduling unit at an information receiving end, wherein the cell processing information comprises input queue information from the input processing unit, and output queue information from the cell scheduling unit; and generating back pressure information according to the cell processing information, wherein the back pressure information is configured to perform back pressure on an information transmitting end;

wherein the step of obtaining cell processing information from an input processing unit and from a cell scheduling unit comprises:

counting a number of related cells based on the input queue information sent by the input processing unit and the output queue information sent by the cell scheduling unit, and according to at least one of a cell priority, an output port, and a source chip number.

An embodiment of the present disclosure provides an apparatus for implementing queue-based flow control. The apparatus includes:

a cell statistical unit, configured to obtain cell processing information from an input processing unit and from a cell scheduling unit at an information receiving end; and a back pressure control unit, configured to generate back pressure information according to the cell processing information, wherein the back pressure information is configured to perform back pressure on an information transmitting end;

wherein the process of obtaining cell processing information comprises:

counting, by the cell statistical unit, a number of related cells based on an input queue information sent by the input processing unit and an output queue information sent by the cell scheduling unit, and according to at least one of a cell priority, an output port, and an source chip number.

An embodiment of the present disclosure provides a switching system. The switching system includes:

a switching memory chip (SM), further including:

a cell statistical unit, configured to obtain cell processing information from an input processing unit and from a cell scheduling unit at an information receiving end; and a back pressure control unit, configured to generate back pressure information according to the cell processing information, wherein the back pressure information is configured to perform back pressure on an information transmitting end.

The switching system also includes a switching crossbar chip (SC). The SC is adapted to: receive the back pressure information; determine the information transmitting end that requires back pressure control according to the back pressure information; and perform back pressure control on the information transmitting end determined.

DETAILED DESCRIPTION OF THE EMBODIMENTS

An embodiment of the present disclosure counts the number of cells from different angles to implement queue flow control. In an embodiment of the present disclosure, the corresponding flow control function does not directly depend on the cell statistical results in the queue management. Instead, the number of cells is counted according to the cell priority, output port and source chip No. of the cells, and then flow control is implemented on this basis.

In an embodiment of the present disclose, the technical scheme for cell queue flow control is used in a system including an information transmitting end and an information receiving end. The information receiving end includes an input processing unit, which is adapted to receive input cells, and a cell scheduling unit, which is adapted to schedule, send and process cells in queues under the management of a queue management unit. The queue management unit adopts the output port-based queue management mode.

Based on the preceding system, the flow control mechanism for cell transmission provided in an embodiments of the present disclosure may generate back pressure information and back pressure cancellation information according to the statistical information on cells so as to perform cell flow control. The corresponding process is described as follows:

1. Collecting statistics on the cell processing information in the input processing unit and cell scheduling unit at the information receiving end, as detailed below:

For the output queue information sent by the cell scheduling unit, the source chip No. of each cell according to the cell priority and output port is determined; and the number of related cells is counted based on the input queue information sent by the input processing unit and according to the cell priority, output port and source chip No. of each cell. Then the statistical results are sent to the back pressure control unit.

2. The information transmitting end that requires back pressure control is determined according to the obtained cell processing information of each unit, and then back pressure control is performed on the information transmitting end.

In this process, the back pressure control on the information transmitting end includes processes of originating the back pressure control and canceling the back pressure control.

(1) The specific process of originating the back pressure control is described as follows:

A cell number threshold is preset according to the bearer capacity of the information receiving end. That is, the cell number threshold for back pressure control is set. When the counted number of cells at the output port is greater than the preset threshold, back pressure information for the related cells is generated, and the information transmitting end of the cells is notified to suspend the transmission according to the cell processing information. An example for the back pressure process is given below:

Example 1

For cells with a certain priority, a cell number threshold for back pressure control is set. If the counted number of cells with the priority that each unit receives or processes exceeds the threshold, back pressure information is generated and back pressure control is performed on the information transmitting end that sends cells with this priority. Besides, a threshold for global back pressure is set, and when the number of cells in the buffer exceeds the threshold, global back pressure information is sent, and all the SMs are controlled to stop sending cells to the SM.

The following describes an application example of the back pressure control:

Supposing the total buffer capacity in the SMe (A) is 10,000, the SMe (A) is set as follows: For cells with priority 0, a threshold for back pressure control is set to 5,000; for cells with priorities 1, 2 or 3, a total threshold for back pressure control is set to 2,000; and a threshold for global back pressure control is set to 7,500. Supposing that the statistical unit obtains the following result at a certain time: The number of cells with priority 0 is 4998, and the total number of cells with priorities 1, 2 and 3 is 800. Supposing that the input processing unit notifies the following information to the cell statistical unit in the subsequent time: 20 cells with priority 0 are added, and 3 cells with priorities 1, 2 or 3 are added. At the same time, the cell scheduling unit notifies the following information to the cell statistical unit: 2 cells with priority 0 are sent, and 2 cells with priorities 1, 2 or 3 are sent. The cell statistical unit obtains the following statistical information according to the information sent from the input processing unit and cell scheduling unit: The number of cells with priority 0 is 5,016, the total number of cells with priorities 1, 2 or 3 is 801, and the number of cells in the buffer is 7,419. The cell statistical unit sends the statistical information to the back pressure control unit. Because the number of cells with priority 0 exceeds the preset threshold of 5,000, the back pressure control unit sends the back pressure information towards the cells with priority 0 to the SC through the uplink cell. When the SC receives the back pressure information, the SC notifies all the SMs to stop sending cells with priority 0 to the SM. Because other SMs stop sending cells with priority 0 to the SMe and meanwhile the SMe (A) continues scheduling cells with priority 0, the number of cells in the buffer gradually decreases. This ensures that the number of cells with priority 0 does not severely exceed the threshold of 5,000. Supposing that the statistical unit obtains the following result after a period of time: The number of cells with priority 0 is 3,000, and the total number of cells with priorities 1, 2, and 3 is 1,502. In this case, the number of cells in the whole buffer is 7,506, which exceeds the threshold of 7,500 for global back pressure. The back pressure control unit notifies all the SMs of the information. All the SMs then stop sending cells to the SMe (A). Thus, the cells in the SMe (A) will not be discarded due to buffer exhaustion.

The preceding example is only an actual application example. In fact, the flow control method depends on the actual requirements. For example, if there is a need to perform different flow control on each SM, different thresholds may be set for different SMs. The whole processes of back pressure generation and cancellation are the same as those in the preceding example.

The preceding cell number threshold for back pressure control is set according to the bearer capacity of the information receiving end from the angles of cell priority, output port and/or source end in combination with the actual requirements. Specifically, the kinds of threshold include the cell number threshold for global back pressure in the whole buffer, cell number threshold for back pressure at an output port, and/or cell number threshold for back pressure in a cell queue. The threshold also includes other kinds of thresholds, for example, the threshold for cells with a certain priority or from a certain chip.

Different cell number thresholds for back pressure control reflect different back pressure control levels. The following gives some examples. According to the counted number of cells in the buffer of the input processing unit, back pressure signals can be sent in the case of insufficient buffer capacity. This back pressure is called global back pressure. According to the counted number of cells at an output port or the counted number of cells with the same priority at an output port, back pressure control can be performed on the queues that need to be sent from the output port. According to the counted number of cells with the same source chip No., output port or priority, back pressure control can be performed on a certain queue. In a word, the back pressure control levels can be set according to the actual requirements and the cell priority, output port and source chip No. of a cell, and may be used in different combinations.

(2) The specific process of the back pressure cancellation control is described as follows:

A cell number threshold is preset according to the bearer capacity of the information receiving end and actual application requirements, that is, a cell number threshold for back pressure cancellation control is set. When the counted number of cells at the output port is equal to or smaller than the preset threshold, back pressure cancellation information for the cells is generated, and the information receiving end of the cells is notified to resume the transmission according to the statistical result of the cell processing information. The cell number threshold for back pressure cancellation control may be the same as or different from the preceding cell number threshold for back pressure control.

The cell number threshold for back pressure cancellation control is set according to the bearer capacity of the information receiving end from the angles of cell priority, output port and/or source end in combination with the actual requirements. The cell number threshold for back pressure cancellation control and the preceding cell number threshold for back pressure control may be used together. The two thresholds may be the same or different.

It can be seen from the technical scheme provided in the preceding embodiment of the present disclosure that, back pressure control may be based on cell statistics, and queue management is directly applied to cell scheduling. An embodiment of the present disclosure separates back pressure control from queue management. Therefore, the back pressure control levels can be adjusted according to the actual requirements and used in different combinations for fine control when necessary. Besides, an embodiment of the present disclosure is easy to manage and implement, occupies few resources, and has a flexible flow control mechanism, thus satisfying the actual application requirements.

An embodiment of the present disclosure may also provide two optional flow control and scheduling schemes in accordance with the present disclosure. The following describes these two optional schemes.

I. Scheme 1

It is a source chip queue-based flow control and scheduling scheme. This scheme adopts a specific queue management mechanism to implement flow control and cell scheduling at the same time.

The source chip queue-based queue management mechanism is based on the following assumption: A switching system has N SMs; each SMe of the N SMs has M output ports; and there are W cell priorities. If the cells received by each SMe are classified according to the rule that cells with the same source SM No., output port and priority form a queue, it is necessary to maintain the information of N*M*W queues. The queue information includes the queue length and location of each cell in the buffer.

Based on the information of N*M*W queues, in the source chip queue-based queue management mechanism, the cell scheduling scheme at the corresponding output port is as follows: an output port is selected; a source chip No. and a priority are selected; a cell in the corresponding queue is selected according to the selection results, and is output. When a cell can be output from an output port of the SMe, the number of cells in the corresponding queue is reduced by one, and the queue information is updated.

According to the source chip queue-based queue management mechanism, the flow control scheme for queue back pressure is as follows: When an SMe (for example, SMe (A)) detects that the queue length of cells or packets from an SMi (for example, SMi (B)) exceeds the preset threshold, the SMe (A) notifies the SMi (B) to stop sending data flows or to send data flows at a lower rate. That is, the SMe (A) can perform flow control on all the SMis one by one. Accordingly, the flow control scheme for global back pressure is as follows: When it is detected that the idle buffer of an SMe is smaller than the threshold, a global back pressure signal is generated and sent to the SC through the SMi of the chip. The SC then notifies all the SMis to stop sending cells to the SMe.

II. Scheme 2

It is an output port queue-based flow control and scheduling scheme. That is, it adopts a specific queue management mechanism to implement output port-based flow control and cell scheduling at the same time.

The output port queue-based queue management mechanism is based on the following assumption: Each SMe in a switching system has M output ports and there are W kinds of cell priorities. If the cells received by each SMe are classified according to the rule that cells with the same output port and priority form a queue, it is necessary to maintain information of M*W queues. The queue information includes the queue length and location of each cell in the buffer.

According to the output port queue-based queue management mechanism, the cell scheduling scheme is as follows: an output port is determine and a priority is selected; a cell in the corresponding queue is selected according to the results, and is output. When a cell can be output from an output port of the SMe, the number of cells in the corresponding queue is reduced by one, and the queue information is updated.

According to the output port queue-based queue management mechanism, the flow control scheme for cell back pressure is as follows: When an SMe detects that the number of cells to be sent from the output port exceeds the preset threshold, the SMe generates a corresponding back pressure signal and sends the signal to the SC through the SMi of the chip. The SC then notifies all the SMis to stop sending data flows to the port. Accordingly, the flow control scheme for global back pressure is as follows: When it is detected that the idle buffer is smaller than the threshold, a back pressure signal is generated and sent to the SC through the SMi of the chip. The SC then notifies all the SMis to stop sending cells to the SMe.

An embodiment of the present disclosure also provides an apparatus for implementing output queue-based flow control. The apparatus is used in a system including an information transmitting end and an information receiving end. The information receiving end includes an input processing unit, a queue management unit and a cell scheduling unit. The queue management unit is directly applied in cell scheduling in an output port-based queue management mode. To make the present disclosure more practical, a cell statistical unit and a back pressure control unit are set in the apparatus.

The cell statistical unit is adapted to: for the output queue information sent by the cell scheduling unit, determine the source chip No. of each cell according to the cell priority and output port; count the number of cells based on the input queue information sent by the input processing unit and according to the cell priority, output port and source chip No. of each cell; and send the statistical results to the back pressure control unit.

The back pressure control unit is adapted to determine the information transmitting end that requires back pressure control according to the obtained cell processing information, and then perform back pressure control on the information transmitting end.

Figure 4:
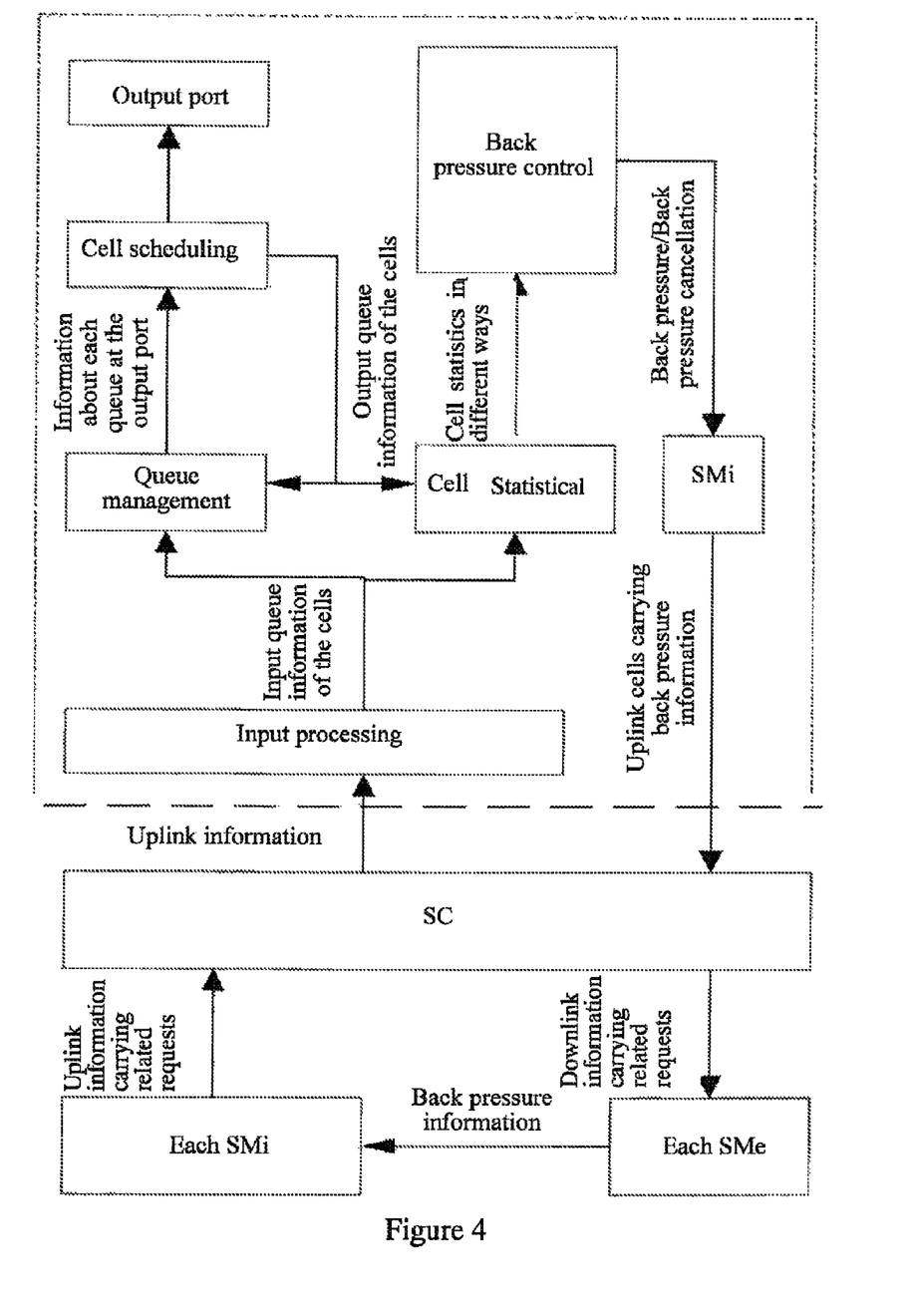
FIG. 4 shows the structure of the apparatus for implementing a cell flow control mechanism according to an embodiment of the present disclosure.

The following describes the functions of each unit in detail in combination with the structure in FIG. 4.

I. An Input Processing Unit

The input processing unit is responsible for receiving downlink cells and sending the input queue information of cells to the queue management unit and cell statistical unit as the cell processing information. The input queue information includes source end (source chip that sends cells) information, output port information and priority information of cells.

II. A Queue Management Unit

The queue management unit has two functions: input queue management and output queue management.

The input queue management means that the queue management unit puts all the cells with the same output port and priority into a queue by using an output port-based queue management mode according to the input queue information sent from the input processing unit. For example, if there are M output ports and W priorities, the queue management unit needs to manage the information of M*W queues at the same time.

The output queue management means that the queue management unit deletes the scheduled cells from the related queues according to the output queue information sent from the cell scheduling unit.

III. A Cell Statistical Unit

The cell statistical unit counts the number of cells according to the current input and output queue information from the angles of cell priority, output port and source chip No., and sends the statistical result to the back pressure control unit. The statistical result is the basis for generating or canceling back pressure. In the processing of output queue information, the cell statistical unit may find the source chip No. according to the output ports and priorities of cells in an output queue. For example, according to the counted number of cells in the buffer, a back pressure signal may be sent in the case of insufficient buffer capacity. According to the counted number of cells at an output port or the counted number of cells with the same priority at an output port, back pressure control may be performed on queues that are to be sent from the output port. According to the counted number of cells with the same source chip No., output port and priority, the back pressure of a queue may be controlled.

The cell statistical unit counts the number of cells according to at least one of: cell priority, output port and source chip No., etc. The statistical information is the basis for performing or canceling back pressure control.

IV. A Cell Scheduling Unit

The cell scheduling unit decides whether there are cells to be scheduled according to the number of cells at each output port sent by the queue management unit. If there are cells to be scheduled, the cell scheduling unit selects a priority and selects a queue from M*W queues. It then schedules the cells that are located upfront in the queue. This ensures that the earliest cells are served first, thus achieving fair scheduling of cells. Meanwhile, the cell scheduling unit notifies the output queue information to the queue management unit and cell statistical unit.

V. A Back Pressure Control Unit

The back pressure control unit sends back pressure information and back pressure cancellation information according to the statistical information sent by the cell statistical unit.

The back pressure control unit performs back pressure control as follows: When the counted number of cells at an output port is greater than the preset threshold, it generates back pressure information for the cells.

Similarly, the back pressure control unit performs back pressure cancellation as follows: When the counted number of cells at an output port is equal to or smaller than the preset threshold, back pressure cancellation information for the cells is generated.

The back pressure control unit in this embodiment includes a back pressure control originating module and a back pressure control execution module.

When the back pressure control originating module, according to the statistical information sent by the cell statistical unit, detects that the number of cells at an output port exceeds the preset threshold for back pressure control, it notifies the back pressure control execution module.

Upon receipt of the notification from the back pressure control originating module, the back pressure control execution module generates back pressure information for the cells, and sends the information.

The back pressure control unit in this embodiment also includes a back pressure cancellation control module.

After the back pressure control originating module notifies the back pressure control execution module, if the back pressure cancellation control module, according to the statistical information sent from the cell statistical unit, detects that the number of cells at an output port is equal to or smaller than the preset threshold for back pressure cancellation control, it notifies the back pressure control execution module.

According to the notification from the back pressure cancellation control module, the back pressure control execution module generates back pressure cancellation information for the cells, and sends the information.

The back pressure control execution module may include one or more global back pressure modules, priority back pressure modules, output port back pressure modules, and queue back pressure modules.

According to the notification from the back pressure control originating module, the global back pressure module generates back pressure control information for cells in the whole buffer, and sends the information.

According to the notification from the back pressure control originating module, the priority back pressure module generates back pressure control information for cells with a certain priority, and sends the information.

According to the notification from the back pressure control originating module, the output port back pressure module generates back pressure control information for cells at an output port, and sends the information.

According to the notification from the back pressure control originating module, the queue back pressure module generates back pressure control information for cells in a queue, and sends the information.

An embodiment of the present disclosure also provides a switching system. The switching system includes an SC and at least one SM. The SM includes a cell statistical unit and a back pressure control unit.

The cell statistical unit and back pressure control unit have been described in detail, and will not be described further.

The following describes the technical scheme of the present disclosure in detail with reference to the accompanying drawings, where various units work with each other to implement cell scheduling and flow control after cells are input in a queue.

Figure 5:
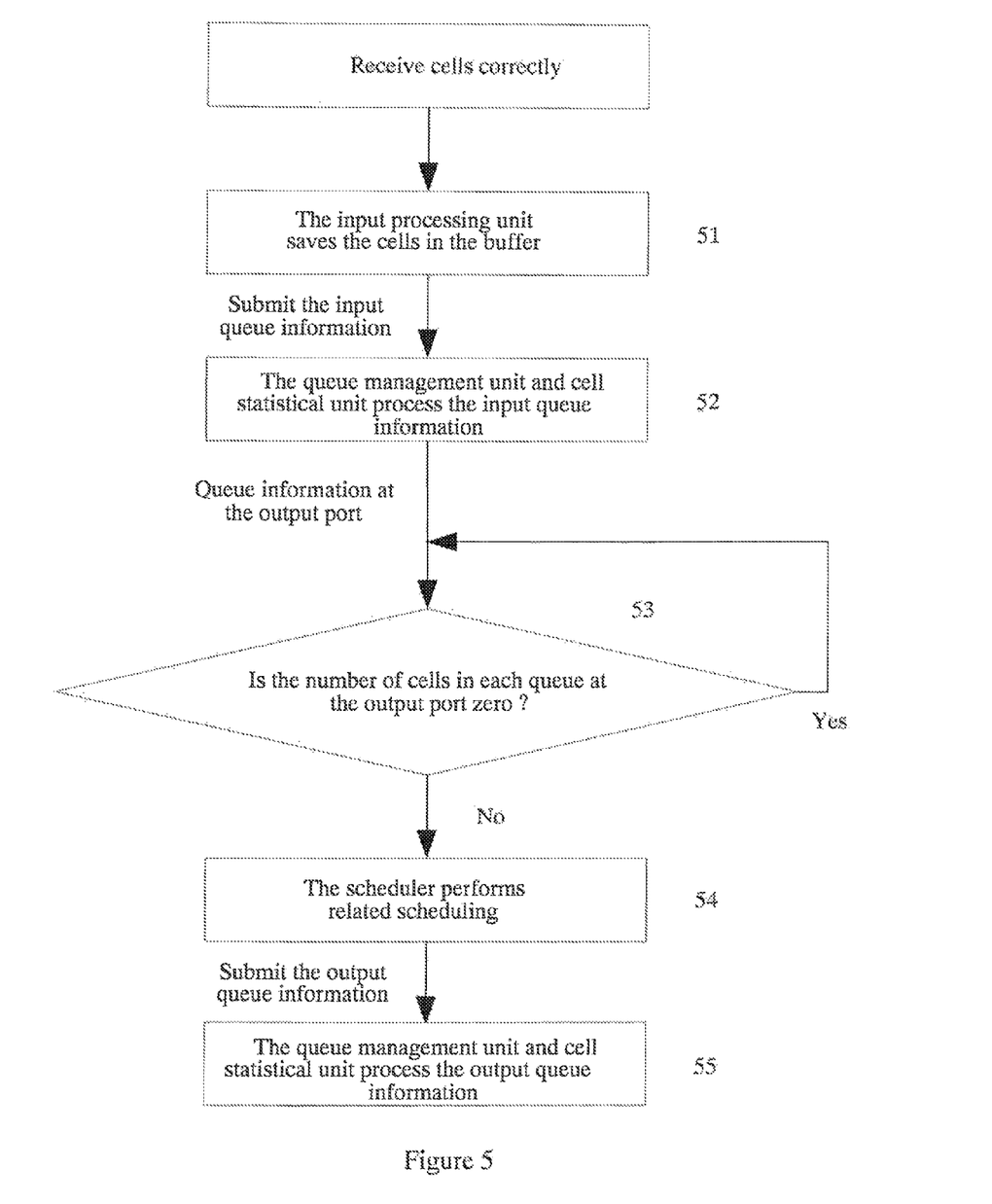
FIG. 5 shows the process of implementing cell scheduling according to an embodiment of the present disclosure.

I. FIG. 5 shows the process from cell input to cell scheduling in the present disclosure. The specific steps are as follows:

Step 51: Cells are received from an input port; the input processing unit saves the cells in the buffer and informs the queue management unit and cell statistical unit of related input queue information. The input queue information includes the source chip, output port and priority of the cells.

Step 52: The queue management unit and cell statistical unit process the input queue information.

The queue management unit performs queue management on the input queue information as follows: the queue management unit puts cells with the same output port and priority in a queue according to the input queue information sent from the input processing unit by using an output port-based queue management mode. The cell statistical unit processes the input queue information as follows: For the input queue information sent from the input processing unit, the cell statistical unit counts the number of cells according to the priority, output port and source chip No. of cells, and sends the result to the back pressure control unit as the basis for originating back pressure control.

Step 53: The cell scheduling unit detects that the number of cells in the output queue is not zero, and then schedules the cells. At the same time, it returns the output queue information of the cells to the queue management unit and the cell statistical unit.

Steps 54 and 55: The queue management unit and the cell statistical unit process the output queue information. The output queue information includes output ports and priorities of cells in the output queue. The management of output queue information performed by the queue management unit includes deleting the scheduled cells from a queue. The cell statistical unit determines the source chip No. of cells according to the output queue information, priority and output port of cells, and then counts the number of cells according to the priority, output port and source chip No. of the cells. It sends the statistical result to the back pressure control unit as the basis for canceling the back pressure.

Through the preceding process, upon receipt of cells, the SMe of the SM can perform queue management on cells at each output port according to the priority and output port of the cells, thus implementing the cell scheduling.

Figure 6:
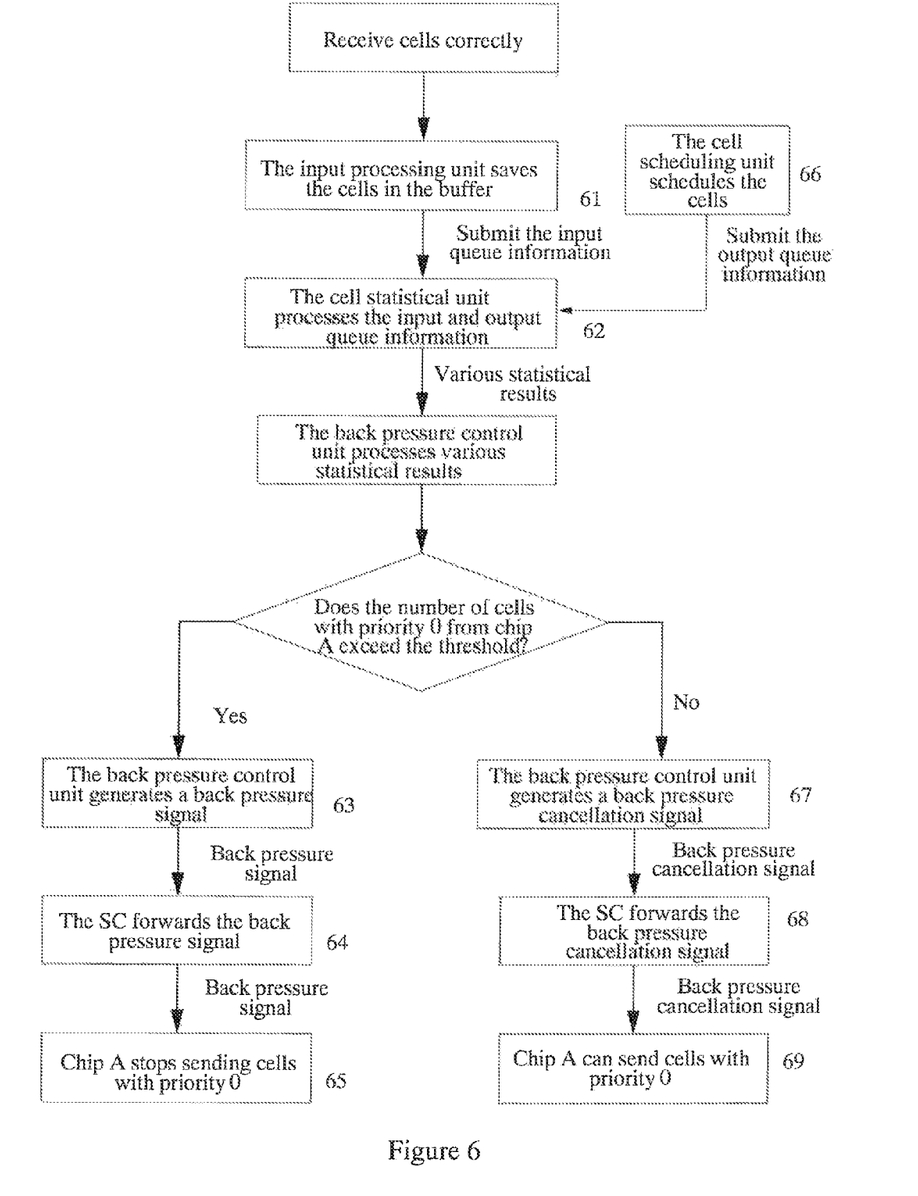
FIG. 6 shows the process of implementing cell flow control according to an embodiment of the present disclosure.

II. FIG. 6 shows the process of implementing the cell flow control in the present disclosure. The following takes the queue of source chip A and priority 0 as an example to describe the flow control process. The flow control processes for other types of queues are similar to this process.

The back pressure control process includes:

Step 61: After the input cells are correctly received and saved in the buffer, the input processing unit sends the related queue information to the cell statistical unit.

Step 66: When cells from chip A with priority 0 are scheduled by the cell scheduling unit, the related output queue information is sent to the cell statistical unit.

Step 62: The cell statistical unit counts the number of cells according to the input and output queue information, and sends various statistical results to the back pressure control unit.

Step 63: The back pressure control unit generates back pressure signals according to the statistical results.

Specifically, the back pressure control unit processes various statistical results and detects whether the number of cells from chip A with priority 0 exceeds the preset threshold. If the number of cells from chip A with priority 0 exceeds the preset threshold, the back pressure control unit generates back pressure signals, and the process proceeds to step 64.

Step 64: The back pressure signals are sent to the SC through the downlink cells and then forwarded through the SC.

Step 65: Upon receipt of back pressure signals, chip A stops sending cells with priority 0.

The back pressure cancellation control process includes:

Step 61: After the input cells are correctly received and saved in the buffer, the input processing unit sends the related queue information to the cell statistical unit.

Step 66: When cells from chip A with priority 0 are scheduled by the cell scheduling unit, the related output queue information is sent to the cell statistical unit.

Step 62: The cell statistical unit counts the number of cells according to the input and output queue information, and sends various statistical results to the back pressure control unit.

Step 67: The back pressure control unit generates back pressure cancellation signals.

Specifically, the back pressure control unit processes various statistical results and detects whether the number of cells from chip A with priority 0 exceeds the threshold. If the number of cells from chip A with priority 0 exceeds the threshold, the back pressure control unit generates back pressure cancellation signals.

Step 68: The back pressure cancellation signals are sent to the SC through the downlink cells and then forwarded through the SC.

Step 69: Upon receipt of back pressure cancellation signals, chip A can resend the cells with priority 0.

Through the preceding process, upon receipt of cells, the SMe may set and count the number of cells according to the priority, output port and source chip No. of the cells. This can implement rough or fine back pressure control. At the rough level, global back pressure can be implemented on the whole buffer. At the fine level, back pressure can be implemented on a queue from a chip with a certain priority.

Embodiments consistent with the present disclosure may not only implement cell scheduling, but may also reduce the number of cell queues to be scheduled and make them easy to manage. Moreover, embodiments consistent with the present disclosure may implement various back pressure control levels.

Although the present disclosure has been described through some exemplary embodiments, the disclosure is not limited to such embodiments. It is apparent that those skilled in the art can make various modifications and variations to the disclosed embodiments without departing from the spirit and scope of the disclosure. The disclosed embodiments are intended to cover the modifications and variations provided that they fall in the scope of protection defined by the following claims or their equivalents.

What is claimed is:

1. A method for implementing queue-based flow control, the method comprising:

obtaining cell processing information from an input processing unit and from a cell scheduling unit at an information receiving end, wherein the cell processing information comprises input queue information from the input processing unit and output queue information from the cell scheduling unit;

obtaining a number of cells from at least one of different source chips, a different cell priority, and different output ports according to the input queue information and the output queue information;

counting a counted number according to the number of cells; and generating back pressure information according to the counted number, wherein the back pressure information is configured to perform back pressure on an information transmitting end.

2. The method for implementing queue-based flow control according to claim 1, wherein the step of generating back pressure information according to the counted number comprises: when the counted number is greater than a first threshold, generating back pressure information for the number of cells, wherein the number of cells is equal to the counted number.

3. The method for implementing queue-based flow control according to claim 2, wherein the first threshold is a group of values that is set according to a bearer capacity of an information receiving end.

4. The method for implementing queue-based flow control according to claim 2, wherein the method further comprises: when the counted number is equal to or smaller than a second threshold, generating back pressure cancellation information for the number of cells.

5. The method for implementing queue-based flow control according to claim 1, wherein performing back pressure comprises: performing global back pressure for all buffered cells, performing priority back pressure for cells with a certain priority, performing output port back pressure for cells for an output port, and performing queue back pressure for cells in a certain queue.

6. The method for implementing queue-based flow control according to claim 1, wherein perform back pressure comprises: perform back pressure on cells from a certain source chip at the information transmitting end.

7. An apparatus for implementing queue-based flow control, comprising:

a cell statistical unit, configured to:

obtain cell processing information from an input processing unit and from a cell scheduling unit at an information receiving end, wherein the cell processing information comprises input queue information from the input processing unit and output queue information from the cell scheduling unit;

obtain a number of cells from at least one of different source chips, a different cell priority, and different output ports according to the input queue information and the output queue information; and count a counted number according to the number of cells; and a back pressure control unit, configured to generate back pressure information according to the counted number, wherein the back pressure information is configured to perform back pressure on an information transmitting end.

8. The apparatus for implementing queue-based flow control according to claim 7, wherein in generating the back pressure information, the back pressure control unit is configured to: generate back pressure information for the counted number of cells when the counted number is greater than a first threshold, wherein the number of cells is equal to the counted number.

9. The apparatus for implementing queue-based flow control according to claim 7, wherein the back pressure control unit is also configured to perform back pressure cancellation.

10. The apparatus for implementing queue-based flow control according to claim 9, wherein the process of performing back pressure cancellation comprises: when the counted number is equal to or smaller than a second threshold, generating, by the back pressure control unit, back pressure cancellation information for the number of cells, wherein the number of cells is equal to the counted number.

11. The apparatus for implementing queue-based flow control according to claim 7, wherein the back pressure information generated by the back pressure control unit comprises: global back pressure information for performing back pressure on all buffered cells, priority back pressure information for performing back pressure on cells with a certain priority, output port back pressure information for performing back pressure on cells at an output port, and queue back pressure information for performing back pressure on cells in a certain queue.

12. The apparatus for implementing queue-based flow, control according to claim 7, wherein perform back pressure comprises: perform back pressure on cells from a certain source chip at the information transmitting end.

13. A switching memory chip (SM) comprising:

a cell statistical unit, configured to:

obtain cell processing information from an input processing unit and from a cell scheduling unit at an information receiving end, wherein the cell processing information comprises input queue information from the input processing unit and output queue information from the cell scheduling unit;

obtain a number of cells from at least one of different source chips, a different cell priority, and different output ports according to the input queue information and the output queue information; and count a counted number according to the number of cells;

a back pressure control unit, configured to generate back pressure information according to the counted number, wherein the back pressure information is configured to perform back pressure on an information transmitting end; and a switching crossbar chip (SC), configured to:

receive the back pressure information;

determine the information transmitting end that requires back pressure control according to the back pressure information; and perform back pressure control on the information transmitting end determined.

14. The SM according to claim 13, wherein the process of generating back pressure information comprises: when the counted number is greater than a first threshold, generating, by the back pressure control unit, back pressure information for the number of cells, wherein the number of cells is equal to the counted number.

15. The SM according to claim 13, wherein the back pressure control unit is also configured to perform back pressure cancellation.

16. The SM according to claim 15, wherein the process of performing back pressure cancellation comprises: when the counted number is equal to or smaller than a second threshold, generating, by the back pressure control unit, back pressure cancellation information for the number of cells, wherein the number of cells is equal to the counted number.

17. The SM according to claim 13, wherein the back pressure information generated by the back pressure control unit comprises: global back pressure information for performing back pressure on all buffered cells in a whole buffer, priority back pressure information for performing back pressure on cells with a certain priority, output port back pressure information for performing back pressure on cells at an output port, and queue back pressure information for performing back pressure on cells in a certain queue.

18. The SM according to claim 13, wherein performing back pressure comprises: performing back pressure on cells from a certain source chip at the information transmitting end.

* * * * *

UNITED STATES PATENT AND TRADEMARK OFFICE
CERTIFICATE OF CORRECTION

PATENT NO.        : 8,174,987 B2                                          Page 1 of 1
APPLICATION NO.   : 12/509081
DATED             : May 8, 2012
INVENTOR(S)       : Wenhua Du et al.

It is certified that error appears in the above-identified patent and that said Letters Patent is hereby corrected as shown below:

ON THE TITLE PAGE:

Item (63) and Item (30) should read:

(63) Related U.S. Application Data
    Continuation of application No. PCT/CN2008/070188, filed on January 25, 2008.

(30) Foreign Application Priority Data
    January 25, 2007 (CN).....................2007 1 0002741

IN THE CLAIMS:

Column 12, line 35, claim 12, should read "The apparatus for implementing queue-based flow control according to claim 7, wherein perform back pressure comprises: perform back pressure on cells from a certain source chip at the information transmitting end."

Signed and Sealed this
Second Day of October, 2012

David J. Kappos
*Director of the United States Patent and Trademark Office*